United States Patent Office 3,825,533
Patented July 23, 1974

3,825,533
N-CARBOXYMETHYL - N - SUBSTITUTED GLYCINATE ESTERS OF 3-HYDROXY-1,4-BENZODIAZEPIN-2-ONES
Abraham Nudelman, Bala Cynwyd, and Ronald J. McCaully, Malvern, Pa., assignors to American Home Products Corporation, New York, N.Y.
No Drawing. Filed Mar. 20, 1972, Ser. No. 236,174
Int. Cl. C07d 53/06
U.S. Cl. 260—239.3 D
4 Claims

ABSTRACT OF THE DISCLOSURE

This invention is directed toward novel central nervous system depressants of the formula:

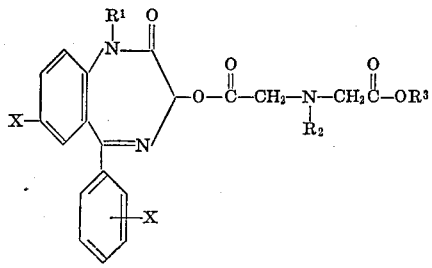

wherein $R^1$ is a member selected from the group consisting of the hydrogen, lower alkyl, benzyl and lower alkoxyalkyl radicals;
$R^2$ is a member selected from the group consisting of the lower alkyl, phenyl and benzyl radicals;
$R^3$ is a member selected from the group consisting of hydrogen, an alkali metal cation, an alkaline earth metal cation, the ammonium cation, a tri(lower)alkyl ammonium cation, the pyridinum ion, a lower alkyl radical and an aralkyl radical of 7 to 9 carbon atoms;
X is a member selected from the group consisting of the halo, cyano, trifluoromethyl, nitro and lower alkylthio radicals;
Y is a member selected from the group consisting of the hydrogen, halo, trifluoromethyl, nitro and lower alkylthio radicals; and the pharmaceutically acceptable N-acid addition salts thereof. This invention also provides methods for the preparation of the central nervous system depressant compounds and their administration as well as the compositions for administration which contain the active compounds of this invention.

DESCRIPTION OF THE INVENTION

This invention relates to the physiologically active N-carboxymethyl-N-substituted glycinate esters of certain 1,3 - dihydro - 3 - hydroxy - 5 - substituted - 2H - 1,4-benzodiazepin-2-ones. The chemical structure of these compounds may be depicted by the following formula:

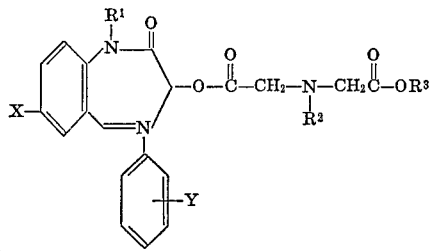

wherein $R^1$ is a member selected from the group consisting of the hydrogen, lower alkyl, benzyl and lower alkoxyalkyl radicals;
$R^2$ is a member selected from the group consisting of the lower alkyl, phenyl and benzyl radicals;
$R^3$ is a member selected from the group consisting of hydrogen, an alkali metal cation, an alkaline earth metal cation, the ammonium cation, a tri(lower)alkyl ammonium ion, the pyridinium ion, a lower alkyl radical and an aralkyl radical of 7 to 9 carbon atoms;
X is a member selected from the group consisting of the halo, cyano, trifluoromethyl, nitro and lower alkylthio radicals;
Y is a member selected from the group consisting of the hydrogen, halo, trifluoromethyl, nitro and lower alkylthio radicals;

and the pharmaceutically acceptable N-acid addition salts thereof.

The hydrated forms of the depicted compounds are also considered to be within the scope of the invention, the anhydrous and various hydrated forms of each compound being readily prepared by drying the initially formed product.

The term "lower" employed throughout this application to modify the expressions alkyl and alkoxy, is intended to include straight and branched chain groups derived from the alkane series which contain from 1 to about 6 carbon atoms, such as methyl, ethyl, $i$-propyl, $n$-propyl, $n$-butyl, $n$-hexyl, and the corresponding alkoxy radicals. The term halo is used to include atoms selected from the group consisting of chlorine, fluorine, bromine and iodine. The term aralkyl is used to designate those radicals which are monovalent, aromatic, hydrocarbon groups in which the single valence bond belongs to the alkyl chain and which contain from about 7 to 9 carbon atoms, such as benzyl and phenethyl. The expression, pharmaceutically acceptable acid addition salts, is used to include those non-toxic acid addition salts which may be formed with either organic or inorganic acids such as hydrochloric, hydrobromic, sulfuric, phosphoric, methane sulfonic, nitric, p-toluene sulfonic, acetic citric, maleic, succinic acid, and the like.

The compounds of the preceding structural formula, where $R^3$ is a positively charged cation are water soluble. Likewise, where $R^3$ is hydrogen or a hydrocarbon group, an acid addition salt may be produced with the glycinate nitrogen atom to form a water soluble compound. In either event, the property of water solubility in a central nervous system depressant compound is of especial significance in that it enables one to prepare dosage formulations wherein a liquid vehicle is required, either for oral or parenteral administration, where the use of a solid drug is not feasible or is contra-indicated as in pre-operative medication where material in the alimentary tract is to be avoided or in the case of administration to a patient unable to swallow a pill or ingest from a solid formulation, as in the case of one suffering from delirium tremens.

As water soluble compounds, the central nervous system depressants of this invention are readily tailored for use over a wide pH range. For example, either acid or base compatible formulations are prepared by either converting the glycine carboxylic acid to a salt with a strong base or by preparing an acid addition salt of the glycine nitrogen atom with a strong acid. Thus, acid stable compositions may be prepared by producing the acid addition salts of the glycine nitrogen atom while alkali stable compositions result from conversion of the glycine carboxylic acid group to a salt with a strong base. Of course the character of the acid employed to produce an addition salt of the glycine nitrogen atom will determine the pH of an aqueous solution of the salt at conventional dosage levels. Furthermore, by employing mixtures of the salts, the resulting systems permit formulation of solutions over a wide range of pH values.

The compounds of the invention may be prepared by the following reaction schemes, the first presented procedure being preferred in the preparation of half esters in which the group $R^3$ is hydrogen or a positively charged cation and $R^1$ is hydrogen, procedure II being preferred in the production of compounds where $R_3$ is lower alkyl or an aralkyl group:

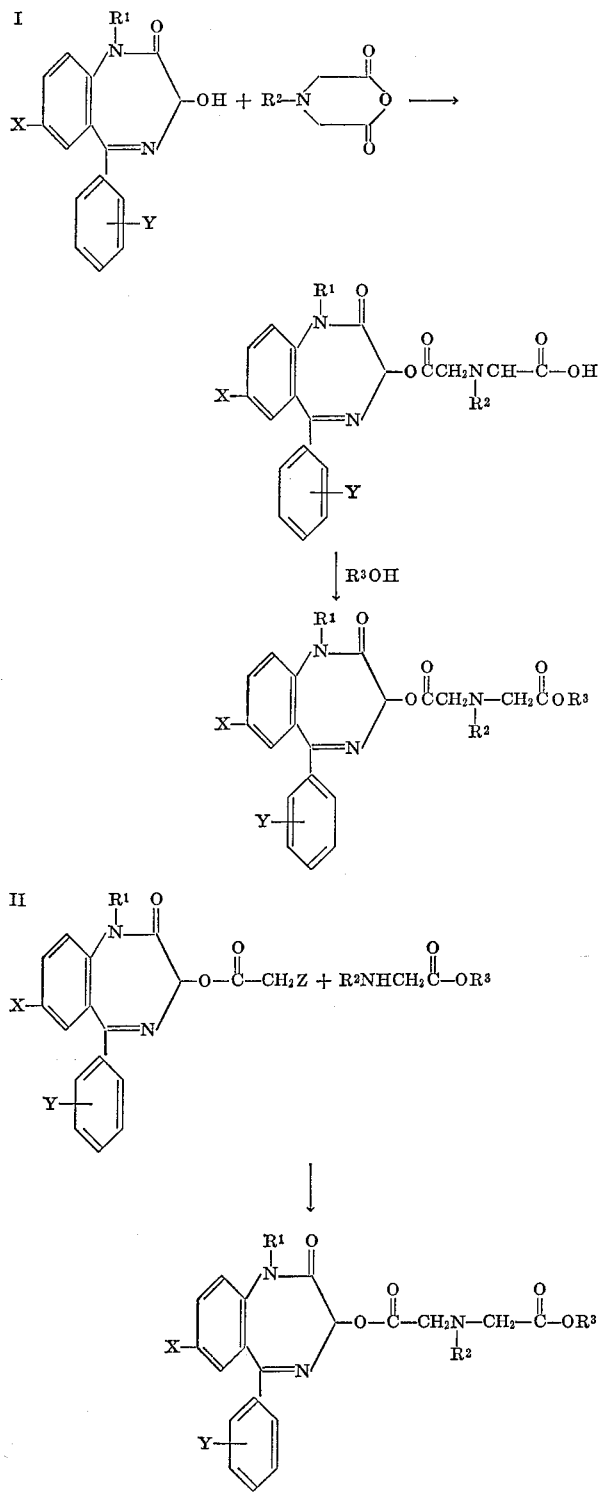

where Z is a halo radical and the groups $R^1$, $R^2$, $R^3$, X and Y have the aforesaid definition.

The N-substituted iminodiacetic acid anhydride employed as a reagent in the first reaction scheme *supra* may be obtained by the procedure of Henry, *J. Het.* *Chem.*, 3,503–511 (1966). The 1,3-dihydro-3-hydroxy-5-substituted phenyl-2H-1,4-benzodiazepin-2-one halo acetate employed as the initial reactant in scheme II *supra* may be prepared either by reaction of chloroacetic anhydride with the 4-oxide of the benzodiazepin-2-one precursors or by the reaction of chloroacetylchloride with the 3-hydroxy precursor of the 1,4-benzodiazepin-2-one reactant. Typical examples of the techniques for production of a chloroacetyl-3-hydroxy-1,4-benzodiazepin-2-one reactant are provided in Examples 1–3, *infra*.

The preparation of the compounds of the instant invention as presented in scheme I is generally performed under anhydrous conditions in a non-reactive organic solvent which is capable of dissolving the reactants, e.g. xylene, benzene, toluene, tetrahydrofuran, pyridine, and the like. The reaction is carried out at a temperature of about 25° to 130° C. and preferably at the reflux temperature of the solvent employed for the reactants. The reaction generally goes satisfactorily to completion in a relatively short time ranging from about 0.5 to 5 hours. After completion of the reaction, the product is recovered by precipitation from diethyl ether as the free acid, from which the desired salt may be produced.

The reaction technique in scheme II, above, involves reacting the appropriate 1,3-dihydro-3-hydroxy-5-substituted phenyl-2H - 1,4 - benzodiazepin-2-one halo acetate with the appropriately substituted amino acid in an nonreactve organic solvent capable of dissolving the reactants. Suitable examples of the solvents include xylene, benzene, toluene and tetrahydrofuran. The reaction is conducted generally at a temperature from about 25 to 80° C. and it takes from about 0.5 up to about 24 hours to go to completion. The reaction solvent is generally removed by evaporation and the residue is dissolved in a water immiscible organic solvent and the solution extracted with water. The organic phase is separated, dried, concentrated and added to a vigirously stirred solution of the appuropriate strong pharmaceutically acceptable acid in diethyl ether.

The compounds of this invention are physiologically active central nervous systems depressants.

In the pharmacological evaluation of the biological activity of compounds of this invention, the *in vivo* effects were tested as follows: The compounds tested were administered orally to 3 mice (14 to 24 grams body weight) at doses ranging from 0.127 milligrams per kilogram body weight to 400 milligrams per kilogram per body weight. The animals were watched for a miinmum of two hours during which time signals of general stimulation (i.e., increased spontaneous motor activity, hyperactivity on tactile stimulation, twitching), general depression (i.e., decrease spontaneous motor activity, decreased respiration) and autonomic activity (i.e., miosis, mydriasis, diarrhea) were noted. The animals were tested for changes in reflexes (i.e., flexor, extensor) and were rated by use of a pole climb and inclined screen for the presence of sedation-ataxia. The "Eddy Hot-Plate Method" (Eddy et al., J. Pharmacol. Exper. Therap. *107*, 385 (1953)) was used to test for analgesia. The experiment was terminated by subjecting each animal to a maximal electro-shock to test for anti-convulsant activity. Following this procedure, the compound of Example IV, *infra*, demonstrated marked depressant and anti-convulsant activity with a response of general stimulation recognized at dosages of 4.0 milligrams per kilogram and above in the form of mild tremors and twitching, general depression recognized in decreased motor activity at 0.4 milligrams per kilogram and above, as well as sedation at 1.27 milligrams per kilogram and above, decreased respiration at 0.4 milligrams per kilogram, ataxia at 0.4 milligrams per kilograms, exophthalmos at 4.0 milligrams per kilogram and above, a certain amount of loss of righting reflex with augmentation of the flexor reflex at dosage concentrations of 40 milligrams per kilogram and above and ptosis at 127 milligrams per kilogram and above with protection from electro-shock at dosages as low as 4.0 milligrams per kilogram.

Additional testing of anti-metrazol activity, anti-reserpine ptosis, anti-tremorine activity, ataxia, anti-morphine activity and maximal electro-shock seizures were conducted and the results correlated and found to be consistent with the establishment of a central nervous system depressant possessing the desirable properties sufficiently correlatable with known depressants to establish a valuable use for the compound of this invention.

Thus, the compounds of this invention are considered to be central nervous system depressants at doses of 4.0 milligrams per kilogram body weight and below in the above mentioned host. Therefore, the compounds of the invention are physiologically active compounds in experimental and comparative pharmacology and are of value in the treatment of mammals, e.g. mice, rats, etc., which are responsive to treatment with central nervous system depressant agents. Specifically, the compounds may be administered for the purpose of inducing a calming effect in mammals.

When the compounds of the invention are employed as described above they may be administered alone or in combination with pharmacologically acceptable carriers, the proportion of which is determined by the chosen route of administration and standard pharmaceutical practice. For example, they may be administered orally in tablet or capsule form with conventional flavors, diluents, lubricants, distintegrators or binding agents as may be required. They may be administered orally in the form of a solution or they may be injected parenterally. For parenteral administration they may be used in the form of a sterile solution containing other solutes, for example, enough saline or glucose to make the solution isotonic. It is most advantageous to provide the compound as a dry powder in a suitable container so that it may be admixed with a suitable aqueous vehicle prior to administration.

A suitable tablet formulation is as follows:

| | Mg. |
|---|---|
| 7 - chloro - 5 - (o - chlorophenyl) - 1,3 - dihydro- 3 - hydroxy - 2H - 1,4 - benzodiazepin - 2 - one, N-carboxymethyl - N - methylglycinate, sodium salt, dihydrate | 5 |
| Microcrystalline Cellulose, N.F. | 20 |
| Magnesium Stearate, U.S.P. | 0.25 |
| Lactose, U.S.P. | 74.75 |
| Total Tablet Weight | 100 |

A suitable reconstitutable injectable formulation is as follows:
1. 7 - chloro - 5 - (o - chlorophenyl) - 1,3 - dihydro- 3 - hydroxy - 2H - 1,4 - benzodiazepin - 2 - one, N-carboxymethyl-N-methylglycinate, sodium salt, dihydrate, 5 mg. (packaged with 95 mg. of lactose in a sealed glass ampoule)
2. Vehicle: Sterile water for injection 5 ml. containing benzyl alcohol 1% and sodium acetate/acetic acid buffer 0.6%

In general, the unit dosage form will contain from 0.5 to 35 milligrams of the active ingredient, the remainder of the formulation constituting known adjuvants. In human treatment, from 1 to 10 milligram and conventionally 5 milligram doses of the active compounds of this invention are considered to be most desirable from the standpoint of uniform presentation for controlled administration.

The following examples are added to illustrate but not necessarily limit the scope of the invention.

EXAMPLE I

7-Chloro-5-(o-chlorophenyl)-1,3-dihydro-3-hydroxy-2H-1,4-benzodiazepin-2-one, chloroacetate A mixture of 7-chloro-5-(o-chlorophenyl)-1,3-dihydro-2H-1,4-benzodiazepin-2-one, 4-oxide (16 g. 0.05 mole) and chloroacetic anhydride (25 g., 0.145 mole) was heated with stirring at 100–110° C. for 2.5 hours. Diethyl ether was added and the mixture was stirred for 10 minutes. The solid obtained (14.7 g., 75% yield) was filtered, washed with diethyl ether and recrystallized from dichloromethane-diethyl, ether, m.p. 232–234° C., n.m.r. (DMSO-D$_6$) p.p.m. ($\delta$); 4.72 (s, 2); 6.10 (s, 1); 7.17 (d, 1); 7.4–8 (m, 6).

Elemental Analysis.—C$_{17}$H$_{11}$Cl$_3$N$_2$O$_3$: Calculated: C, 51.35; H, 2.79; N, 7.05. Found C, 51.26; H, 2.83; N, 6.94.

Following the procedure of the preceding paragraph, react 7-chloro-1,3-dihydro-5-phenyl-2H-1,4-benzodiazepin-2-one, 4-oxide with chloroacetic anhydride to produce 7-chloro - 1,3 - dihydro - 3 - hydroxy - 5 - phenyl-2H - 1,4-benzodiazepin-2-one, chloroacetate.

EXAMPLE II

7-Chloro-5-(o-chlorophenyl)-1,3-dihydro-3-hydroxy-1-methyl-2H-1,4-benzodiazepin-2-one, chloroacetate This compound was prepared by the same procedure as the one described for Example I from 7-chloro-5-(o-chlorophenyl) - 1,3 - dihydro - 1 - methyl - 2H - 1,4-benzodiazepin-2-one, 4-oxide (6.7 g., 0.02 mole) and chloroacetic anhydride (12 g., 0.07 mole). The obtained product (6.8 g., 82.6% yield) had m.p. 172–174° C., n.m.r. (DCCl$_3$), p.p.m. ($\delta$); 3.51 (s, 3); 4.41 (s, 2); 6.15 (s, 1); 7.19 (d, 1); 7.4–8 (m, 6).

Elemental Analysis.—C$_{18}$H$_{13}$N$_2$Cl$_3$O$_3$.—Calculated: C, 52.52; H, 3.18; N, 6.80; Cl, 25.84. Found: C, 52.27; H, 3.37; N, 6.61; Cl, 25.72.

EXAMPLE III

7-Chloro-5-(o-chlorophenyl)-1,3-dihydro-3-hydroxy-1-methyl-2H-1,4-benzodiazepin-2-one, chloroacetate To a solution of 7-chloro-5-(o-chlorophenyl)-1,3-dihydro-3-hydroxy-1-methyl - 2H - 1,4-benzodiazepin-2-one (10 g., 0.03 mole) and 4-dimethylamino-pyridine (3.66 g., 0.03 mole) in 200 ml. of tetrahydrofuran, was added chloroacetyl chloride (3.39 g., 0.03 mole). A very heavy precipitate formed instantly. After 10 minutes of stirring, no trace of 7-chloro-5-o-chlorophenyl)-1,3-dihydro-3-hydroxy-1-methyl-2H-1,4-benzodiazepin-2-one could be detected by thin layer chromatography (silica plates using diethyl ether as the eluent). The precipitate was filtered off and the filtrate was flash evaporated, to give an oil which crystallized upon addition of diethyl ether. Collected 12.1 g. (99% yield). The m.p. IR and n.m.r. spectra of this product were identical to those described above in Example II.

Following the procedure of the preceding paragraph, 7-chloro - 1,3 - dihydro - 3 - hydroxy - 1 - methyl - 5-phenyl-2H-1,4-benzodiazepine-2-one reacts with chloroacetyl chloride to produce the corresponding chloroacetate.

EXAMPLE IV

7 - Chloro - 5 - (o - chlorophenyl) - 1,3 - dihydro - 3-hydroxy - 2H - 1,4 - benzodiazepin - 2 - one, N-carboxymethyl-N-methylglycinate, sodium salt, dihydrate A solution of 7-chloro-5-(o-chlorophenyl)-1,3-dihydro-3-hydroxy - 2H - 1,4-benzodiazepin-2-one (10 g., 0.031 mole) and methyliminodiacetic acid anhydride (16 g., 0.128 mole) in 150 ml. of anhydrous pyridine was stirred at 95° C. for 2 hours. The solution was then poured into 1 liter of diethyl ether, and the obtained precipitate was filtered, washed with diethyl ether, and dissolved in 600 ml. of tetrahydrofuran. A small amount of insoluble material was removed by filtration and the filtrate was treated with charcoal, filtered again, and flash evaporated to give a pale yellow foam (8.5 g.). Part of the form (4.5 g.) was dissolved in 10 ml. of ethyl alcohol, and sodium hydroxide (0.5 g.) in 1 ml. of water was added. After stirring the solution for 15 minutes it was added slowly to diethyl ether which was being stirred vigorously. A white precipitate formed, which was filtered, washed with diethyl ether and dried to give 2.7 g. (53% yield) of 7-chloro - 5 - (o - chlorophenyl) - 1,3 - dihydro - 3 - hydroxy-2H-1,4-benzodiazepin-2-one, N - carboxymethyl-N-methylglycinate sodium salt, dihydrate. The product did not melt sharply but decomposed above 170° C., n.m.r. (DMSO–D$_6$), p.p.m. (δ), 2.40 (s, 3), 3.08 (s, 2), 3.65 (s, 2), 6.00 (s, 1), 7.10 (d, 1), 7.4–8.2 (m, 6).

Elemental Analysis.—C$_{20}$H$_{16}$Cl$_2$N$_3$NaO$_5$·2H$_2$O: Calculated: C, 47.26; H, 3.97; N, 8.27. Found: C, 46.98; H, 3.84; N, 8.23.

EXAMPLE V

7 - Chloro - 5 - (o - chlorophenyl) - 1,3 - dihydro - 3 - hydroxy-2H-1,4-benzodiazepin-2-one, N-carbomethoxymethyl-N-methylglycinate, methylane sulfonate salt React equimolar proportions of methyl N-methylglycinate with 7-chloro-5-(o-chlorophenyl)-1,3-dihydro-3-hydroxy-2H-1,4-benzodiazepin-2-one, chloroacetate in the presence of pyridine. The product, the methyl ether of 7-chloro-5-(o-chlorophenyl) - 1,3 - dihydro-3-hydroxy-2H-1,4-benzodiazepin-2-one, N-carbomethoxymethyl-N-methylglycinate, is recovered, after extractive purification of the crude material, by precipitation of the methane sulfonate addition salt from methanol-diethyl ether.

EXAMPLE VI

7-Chloro - 5 - (o-chlorophenyl)-1,3-dihydro-3-hydroxy-1-methyl-2H-1,4-benzodiazepin - 2 - one, N-carboxymethyl-N-phenylglycinate, sodium salt A solution of 7-chloro-5-(o-chlorophenyl)-1,3-dihydro-3-hydroxy-1-methyl-2H - 1,4 - benzodiazepin-2-one and phenyliminodiacetic acid anhydride in anhydrous pyridine is stirred at about 95° C. for approximately two hours at which time the solution is poured into diethyl ether. The precipitate is filtered, washed with diethyl ether and dissolved in tetrahydrofuran for removal of a small amount of unsoluble material and treatment with charcoal. The tetrahydrofuran is removed by evaporation and the residue is dissolved in ethyl alcohol. An aqueous solution of sodium hydroxide is added to the ethanol solution and the resulting solution is slowly added to vigorously stirred diethyl ether. The resulting precipitate is recovered by filtration, washed with diethyl ether and dried to yield the sodium salt of the title compound.

EXAMPLE VII

7-Chloro - 5 - (o-chlorophenyl)-1,3-dihydro-3-hydroxy-1-methyl-2H-1,4-benzodiazepin - 2 - one, N-carbethoxymethyl-N-phenylglycinate, hydrochloric acid addition salt An equimolar ratio of 7-chloro-5-(o-chlorophenyl)-1,3-dihydro-3-hydroxy-1-methyl-2H-1,4-benzodiazepin-2-one, chloroacetate and ethyl N-phenylglycinate is stirred in pyridine at about 80° C. for approximately 2 hours. The reaction product is recovered and purified after removal of the pyridine, as the hydrochloride salt by precipitation from methanolic HCl by slow addition of diethyl ether.

EXAMPLE VIII

7-Chloro - 1,3 - dihydro-3-hydroxy-5-phenyl-2H-1,4-benzodiazepin-2-one, N - carboxymethyl-N-ethylglycinate, sodium salt Following the procedure of Example IV, with the exception that ethyliminodiacetic acid anhydride and 7-chloro-1,3-dihydro - 3 - hydroxy-5-phenyl-2H-1,4-benzodiazepin-2-one, are employed as the reactants, affords the title compound in good yield.

EXAMPLE IX

7-Chloro-1,3-dihydro-3-hydroxy - 5 - phenyl-2H-1,4-benzodiazepin-2-one, N-carbobenzyloxymethyl - N - benzylglycinate, methane sulfonate salt By substituting benzyl N-benzyl-glycinate and 7-chloro-1,3-dihydro-3-hydroxy - 5 - phenyl-2H-1,4-benzodiazepin-2-one, chloroacetate for the reactants of Example V and conducting the reaction at a temperature of about 95° C. for about 5 hours, the title product is obtained.

EXAMPLE X

7 - Chloro-1,3-dihydro - 3 - hydroxy-1-methyl-5-phenyl-2H - 1,4 - benzodiazepin-2-one, N-carboxymethyl-N-methyl-N-methylglycinate, ammonium salt Following the procedure of Example IV with the exception that 7-chloro-1,3-dihydro-3-hydroxy-1-methyl-5-phenyl-2H-1,4-benzodiazepin-2-one serves as the initial reactant and ammonia is bubbled through the purified solution of the product in ethanol to produce the ammonium salt, the title compound is produced in good yield.

EXAMPLE XI

7 - Chloro - 1,3 - dihydro-3-hydroxy-1-methyl-5-phenyl-2H-1,4-benzodiazepin - 2 - one, N-carbomethoxy-N-methylglycinate, methane sulfonate salt The procedure of Example V is followed with the exception that 7 - chloro - 1,3-dihydro-3-hydroxy-1-methyl-5-phenyl-2H-1,4-benzodiazepin-2-one, chloroacetate serves as the initial reactant to obtain the title compound.

What is claimed is:

1. A compound selected from the group consisting of:

in which

R$^1$ is a member selected from the group consisting of the hydrogen, alkyl of 1 to 6 carbon atoms, benzyl and alkoxyalkyl of 1 to 6 carbon atoms in each alkyl moiety;

R$^2$ is a member selected from the group consisting of alkyl of 1 to 6 carbon atoms, phenyl and benzyl;

R$^3$ is a member selected from the group consisting of hydrogen, an alkali metal cation, an alkaline earth metal cation, the ammonium cation, a tri(lower) alkyl ammonium cation, the pyridinum ion, alkyl of 1 to 6 carbon atoms and hydrocarbyl aralkyl of 7 to 9 carbon atoms;

X is a member selected from the group consisting of halo, cyano, trifluoromethyl, nitro and alkylthio of 1 to 6 carbon atoms;

Y is a member selected from the group consisting of hydrogen, halo, trifluoromethyl, nitro and alkylthio of 1 to 6 carbon atoms and; the pharmaceutically acceptable N-acid addition salts thereof.

2. A compound of Claim 1 of the formula:

in which

R¹ is a member selected from the group consisting of hydrogen alkyl of 1 to 6 carbon atoms;

R² is a member selected from the group consisting of alkyl of 1 to 6 carbon atoms, phenyl and benzyl;

R₃ is a member selected from consisting of hydrogen, an alkali metal cation, an alkaline earth metal cation, the ammonium cation, a tri(lower)alkyl ammonium cation, and the pyridinum cation.

3. A compound of Claim 1 of the formula:

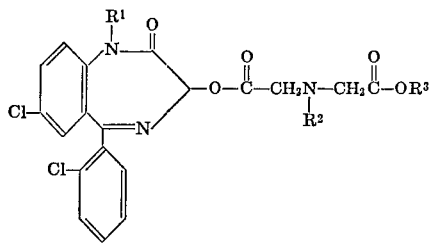

in which

R¹ is a member selected from the group consisting of hydrogen and of 1 to 6 carbon atoms;

R² is a member selected from the group consisting of alkyl of 1 to 6 carbon atoms, phenyl and benzyl;

R³ is a member selected from the group consisting of alkyl of 1 to 6 carbon atoms and hydrocarbyl aralkyl of 7 to 9 carbon atoms;

and pharmaceutically acceptable acid addition salts thereof.

4. A compound as defined in Claim 2 which is an alkali metal salt of 7-chloro-5-(o-chlorophenyl) - 1,3 - dihydro-3-hydroxy-2H-1,4-benzodiazepin-2-one, N-carboxymethyl-N-methylglycinate.

References Cited
UNITED STATES PATENTS

| | | | |
|---|---|---|---|
| 3,321,469 | 5/1967 | Walkenstein | 260—239.3 D |
| 3,445,458 | 5/1969 | Bell | 260—239.3 D |
| 3,514,445 | 5/1970 | Bell | 260—239.3 D |
| 3,654,267 | 4/1972 | Jommi et al. | 260—239.3 D |

HENRY R. JILES, Primary Examiner

R. T. BOND, Assistant Examiner

U.S. Cl. X.R.

260—247.7 J: 424—263. 244